United States Patent [19]

Haug

[11] 4,360,655
[45] Nov. 23, 1982

[54] HEAT-CURABLE MIXTURES, WHICH ARE STABLE ON STORAGE, OF EPOXIDE COMPOUNDS β-AMINOCROTONIC ACID DERIVATIVES AND POLYAMINE

[75] Inventor: Theobald Haug, Frenkendorf, Switzerland

[73] Assignee: Ciba-Geigy Corporation, Ardsley, N.Y.

[21] Appl. No.: 268,922

[22] Filed: Jun. 1, 1981

Related U.S. Application Data

[62] Division of Ser. No. 89,014, Oct. 29, 1979, Pat. No. 4,291,146.

[30] Foreign Application Priority Data

Aug. 11, 1978 [CH] Switzerland .................. 11480/78

[51] Int. Cl.³ .............................................. C08G 59/52
[52] U.S. Cl. ................................... 528/120; 528/107; 528/113; 528/117; 528/310; 528/121
[58] Field of Search ............... 528/120, 107, 113, 117, 528/310, 121

[56] References Cited

U.S. PATENT DOCUMENTS

| | | | |
|---|---|---|---|
| 3,637,901 | 1/1972 | Bargain et al. | 525/422 |
| 3,795,659 | 3/1974 | Renwick | 528/119 |
| 4,291,146 | 9/1981 | Haug | 528/119 |

FOREIGN PATENT DOCUMENTS 125275 4/1977 Fed. Rep. of Germany .
1492763 11/1977 United Kingdom .

*Primary Examiner*—Harold D. Anderson
*Attorney, Agent, or Firm*—Harry Falber

[57] ABSTRACT

Heat-curable mixtures of one or more epoxide compounds, which, on average, have more than one epoxide group in the molecule, and one or more β-aminocrotonic acid derivatives, such as β-aminocrotononitrile, β-aminocrotonamide or β-aminocrotonic acid esters, and also, if desired, a polyamine or polycarboxylic acid anhydride or a maleimide. The novel curable mixtures are distinguished by outstanding stability on storage, can be processed easily and give moulded materials with good mechanical properties.

6 Claims, No Drawings

HEAT-CURABLE MIXTURES, WHICH ARE STABLE ON STORAGE, OF EPOXIDE COMPOUNDS β-AMINOCROTONIC ACID DERIVATIVES AND POLYAMINE

This is a division of application Ser. No. 089,014 filed on Oct. 29, 1979, now U.S. Pat. No. 4,291,146.

The present invention relates to novel mixtures which are based on epoxide resins and β-aminocrotonic acid derivatives and are stable on storage and heat-curable and to a process for the production of moulded materials from these curable mixtures.

It has been disclosed in DDR Pat. No. 125,275 that polymeric products are obtained when adducts of maleic anhydride and fatty acid triglycerides are reacted with polyaminocrotonic acid esters in equivalent amounts. In this specification, polyaminocrotonic acid esters are understood as meaning condensation products of amines which are at least bifunctional and β-ketoesters. It is further disclosed in the said patent specification that the mixtures consisting of maleic acid adducts and polyaminocrotonic acid esters can also be modified with compounds containing epoxide groups. When the equivalent ratios employed in the said specification are applied and the hexamethylene-bis-amino acid ester employed in Example 1 of DDR Pat. No. 125,275 is used on conventional, curable epoxide resin mixtures containing hexahydrophthalic anhydride and bisphenol A diglycidyl ether, no advantages can be achieved under these conditions, since the moulded materials produced from these epoxide resin mixtures are soft and break when subjected to more extensive deformation.

It has now been found that specific β-aminocrotonic acid derivatives are valuable curing agents for epoxide resins if these derivatives are used in an amount which is less than equivalent based on the epoxide resin component, i.e. in less than the equivalent amount. The curable mixtures consisting of epoxide resins and β-aminocrotonic acid derivatives are furthermore distinguished by an advantageous storage stability and good processability.

The present invention thus relates to heat-curable mixtures which are stable on storage and which contain (a) one or more epoxide compounds with, on average, more than one epoxide group in the molecule and (b) one or more β-aminocrotonic acid derivatives of the formulae I to X $$NC-CH=C(CH_3)-N(R^1)_{\overline{n}}Y \quad (I)$$

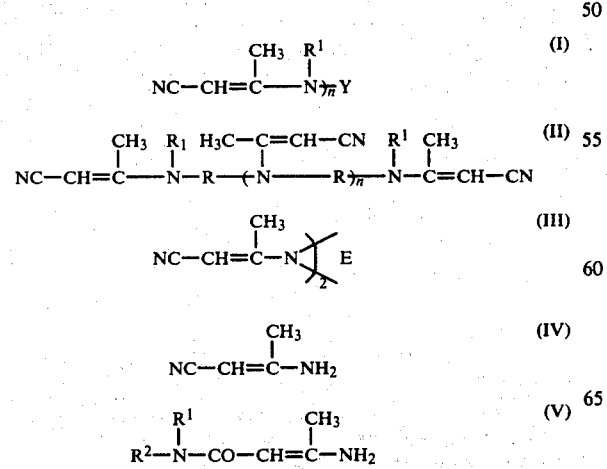

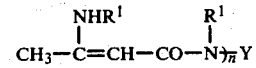  (VI)

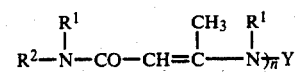  (VII)

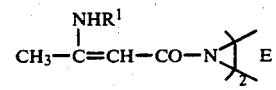  (VIII)

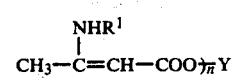  (IX)

or

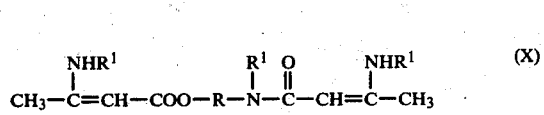  (X)

in which $R^1$ and $R^2$ independently of one another are each a hydrogen atom, alkyl having 1 to 6 C atoms, cycloalkyl having 5 or 6 C atoms or aryl having 6 to 10 C atoms, Y is a n-valent organic radical having 2 to 30 C atoms, R is an aromatic or aliphatic radical having not more than 30 C atoms, E, together with the two N atoms, is a heterocyclic, five-membered or six-membered ring and n is a number from 1 to 3, the curable mixture containing 2 to 8 and preferably 3 to 5 epoxide equivalents per 1 equivalent of β-aminocrotonic acid derivative, containing the grouping

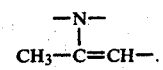

The curable mixtures can also contain (c) a polyamine of the formula XI $$G-(NH_2)_y \quad (XI)$$

in which the radical G is a y-valent organic radical having 2 to 40 C atoms and y is a number from 2 to 4, a polycarboxylic acid anhydride of the formula XII

  (XII)

in which Q is an alkylene radical having 1–4 C atoms, a substituted or unsubstituted arylene radical or a cycloaliphatic radical, or a maleimide of the formula XIII

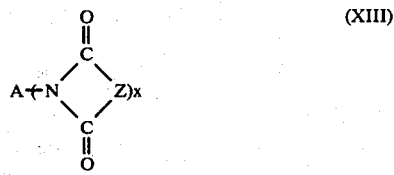  (XIII)

in which A is a x-valent organic radical having 2 to 30 C atoms, Z is vinylene or methylvinylene and x is a number from 1 to 3.

The mixtures according to the invention preferably contain a glycidyl ether or a N-glycidyl compound as the epoxide compound and a β-aminocrotonic acid derivative of the formula I, III, IV, V, VI, VII, VIII, IX or X, in which $R^1$ is a hydrogen atom and $R^2$ is an alkyl having 1 to 6 C atoms, Y is alkylene having 2 to 10 C atoms, m- or p-phenylene or a divalent radical of the formulae $$-C_2H_4-O-C_2H_4-, \quad -C_2H_4-S-C_2H_4-,$$

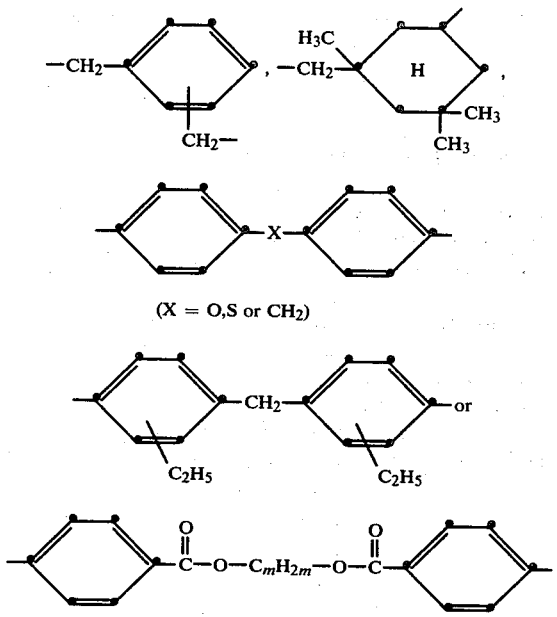

(X = O, S or CH$_2$)

(m = 2 to 8)
R is an aliphatic radical having not more than 10 C atoms, the grouping

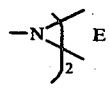

is the radical of the formula

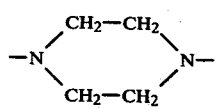

and n is 2.

In a particular embodiment, the mixtures according to the invention consist of diglycidyl ethers of dihydric phenols and β-aminocrotonic acid derivatives of the formulae I, IV, V or VI, especially of the formula VI, in which $R^1$, $R^2$, Y and n are as defined for the preferred embodiment.

Compounds suitable as the epoxide compound (a), which can be cured by the β-aminocrotonic acid derivatives of the formulae I to X, are all known categories of epoxide resins. Preferred compounds are, in particular, epoxide compounds which have, on average, more than one glycidyl group, β-methylglycidyl group or 2,3-epoxycyclopentyl group bonded to a hetero-atom (for example sulfur and preferably oxygen or nitrogen); examples are, in particular, the di- and poly-glycidyl ethers of polyhydric aliphatic alcohols, such as 1,4-butanediol, or polyalkylene glycols, such as polypropylene glycols; di- or polyglycidyl ethers of cycloaliphatic polyols, such as 2,2-bis-(4-hydroxycyclohexyl)-propane; di- or poly-glycidyl ethers of polyhydric phenols, such as resorcinol, bis-(p-hydroxyphenyl)-methane, 2,2-bis-(p-hydroxy-phenyl)-propane (=diomethane), 2,2-bis-(4'-hydroxy-3',5'-dibromophenyl)-propane or 1,1,2,2-tetrakis-(p-hydroxyphenyl)-ethane, or of condensation products of phenols and formaldehyde which are obtained under acid conditions, such as phenol novolacs and cresol novolacs; di- or poly-(β-methylglycidyl) ethers of the abovementioned polyhydric alcohols or polyhydric phenols and the N-glycidyl derivatives of amines, amides and heterocyclic nitrogen bases, such as N,N-diglycidylaniline, N,N-diglycidyl-toluidine and N,N,N',N'-tetraglycidyl-bis-(p-aminophenyl)-methane; triglycidyl isocyanurate; N,N'-diglycidylethyleneurea; N,N'-diglycidyl-5,5-dimethyl-hydantoin and N,N'-diglycidyl-5-isopropylhydantoin; and N,N'-diglycidyl-5,5-dimethyl-6-isopropyl-5,6-dihydrouracil.

Further suitable epoxide compounds are polyglycidyl esters of polybasic carboxylic acids, such as phthalic acid, terephthalic acid, Δ$^4$-tetrahydrophthalic acid and hexahydrophthalic acid; and also alicyclic diepoxides, such as vinylcyclohexene dioxide, limonene dioxide, dicyclopentadiene dioxide and ethylene glycol bis-(3,4-epoxytetrahydrodocyclopentadien-8-yl)-glycidyl ether, and also compounds containing two epoxycyclohexyl radicals, such as diethylene glycol bis-(3,4-epoxycyclohexanecarboxylate), bis-(3,4-epoxycyclohexyl-methyl) succinate, 3',4'-epoxy-6'-methylcyclohexyl-methyl 3,4-epoxy-6-methylcyclohexane-carboxylate and 3',4'-epoxyhexahydrobenzal 3,4-epoxycyclohexane-1,1-dimethanol.

β-Aminocrotononitrile, which is indicated by formula IV, is known. The N-alkylene- or N-arylene-poly-(β-aminocrotononitriles) of the formulae I to III are likewise known compounds. The crotononitriles of the formulae I to III can be prepared by the processes described in "Journal für praktische Chemie," Volume 78 (1908), page 497 or in "Berichte der Deutschen Chemischen Gesellschaft," Volume 60 (1927), page 1,826, by reacting β-aminocrotononitrile with polyamines of the formulae Ia to IIIa

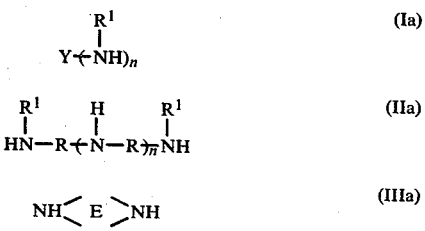

in which Y, R, $R^1$, n and E are as defined in the formulae I to III, with the elimination of ammonia.

Examples of amines of the formula Ia are: ethylenediamine, butylenediamine, hexamethylenediamine, 2,4,4-trimethylhexamethylenediamine, octamethylenediamine, decamethylenediamine, dodecamethylenediamine, 2,2-dimethyl-1,3-diaminopropane, 2,5-dimethyl-1,5-diaminoheptane, 2,5-dimethyl-1,6-diamino-hexane, 2,5-dimethyl-1,7-diaminoheptane,3,3,5-trimethyl-1,6-diaminohexane, 1,2-bis-(3-aminopropoxy)-ethane, 3-methoxy-1,6-diaminohexane, $H_2N(CH_2)_3O(CH_2)_3NH_2$, $H_2N(CH_2)_3$—$NH_2$, $H_2N$—$C_2H_4$—$S$—$C_2H_4$—$NH_2$, $H_2N(CH_2)_3N(CH_2)_3NH_2$, 4,4-diamino-dicyclohexylmethane, 1,4-diamino-cyclohexane, m-phenylenediamine, p-phenylenediamine, 4,4'-diamino-diphenylmethane, 3,3'-dichloro-4,4'-diaminodiphenylmethane, bis-(4-aminophenyl)-2,2-propane, 4,4'-diamino-diphenyl ether, 4,4'-diaminodiphenylsulfone, 1,5-diaminonaphthalene, m-xylenediamine, p-xylenediamine, bis-(γ-aminopropyl)-5,5-dimethyl-hydantoin, 4,4'-diaminotriphenyl phosphate, 3-aminomethyl-3,5,5-trimethylcyclohexylamine ("isophoronediamine"), 4,4'-methylene-bis-(2-methylcyclohexylamine), 4-amino-3-aminomethyl-piperidine, N-substituted 3-amino-4-aminomethylpyrrolidines, phenylindanediamine, 2,5-di-(ω-aminoalkyl)-pyrazine, bis-(p-aminobenzoate) or bis-(anthranilate) of aliphatic diols and also disecondary diamines, such as N,N'-di-(cyclohexyl)-hexamethylenediamine or N,N'-di-(cyclopentyl)-hexamethylenediamine.

Examples of trivalent amines of the formula Ia are: 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl ether, 2,4,4'-triaminodiphenylmethane, 2,4,4'-triaminodiphenylsulfone, 2,4,4'-triaminobenzophenone, 2,4,4'-triamino-3-methyl-diphenylmethane, N,N,N-tri-(4-aminophenyl)-amine, tri-(4-aminophenyl)-methane, tri-(4-aminophenyl) phosphate, tri-(4-aminophenyl) phosphite, tri-(4-aminophenyl) thiophosphate and also $O=P(O$—$CH_2$—$CH_2$—$NH_2)_3$,

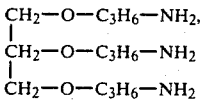

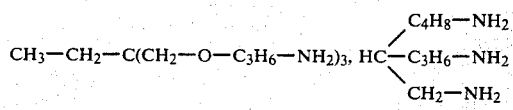

and 1,8-diamino-4-aminomethyl-octane.

Suitable amines of the formula IIa are, for example, the dialkylenetriamines and trialkylenetetramines, preferably those with an alkylene radical containing 2 to 6 carbon atoms, for example diethylenetriamine, triethylenetetramine, dipropylenetriamine, tripropylenetetramine or tributylenetetramine.

Amines of the formula IIIa are piperazines, tetrahydropyridine and imidazolidine.

The β-aminocrotonic acid amides of the formula V are known and are obtained by reacting acetoacetamide with ammonia or primary or secondary amines. Examples of compounds of the formula V are β-aminocrotonic acid monomethylamide, β-aminocrotonic acid isopropylamide, β-aminocrotonic acid n-butylamide, β-aminocrotonic acid dimethylamide, β-aminocrotonic acid diethylamide, β-aminocrotonic acid anilide, β-aminocrotonic acid hexylamide and β-aminocrotonic acid morpholide.

The β-aminocrotonic acid derivatives of the formulae VI to X likewise belong to a known category of compounds and can be prepared in accordance with the processes described in "Liebigs Annalen," Volume 213, page 171 or in "Berichte der Deutschen Chemischen Gesellschaft," Volume 20, page 274 (1887), by reacting the corresponding β-ketocarboxylic acid esters or acid amides with ammonia or mono- or di-amines.

Examples of compounds of the formula VI are: N,N'-bis-(β-aminocrotonyl)-ethylenediamine, N,N'-bis-(β-aminocrotonyl)-hexamethylenediamine, N,N'-bis-(β-aminocrotonyl)-2,4,4-trimethylhexamethylenediamine, N,N'-bis-(β-aminocrotonyl)-dodecamethylenediamine, N,N'-bis-(β-aminocrotonyl)-m-phenylenediamine, N,N'-bis-(β-aminocrotonyl)-4,4'-diaminodiphenylmethane, N,N'-bis-(β-aminocrotonyl)-3,3'-dichloro-4,4'-diaminodiphenylmethane, N,N'-bis-(β-aminocrotonyl)-4,4'-diamino-3,3'-dimethyldicyclohexylmethane, N,N'-bis-(β-aminocrotonyl)-1,4-diaminocyclohexane, N,N'-bis-(β-aminocrotonyl)-p-xylylenediamine, N,N'-bis-(β-aminocrotonyl)-1,3-di-(γ-aminopropyl)-5,5-dimethylhydantoin, N,N'-bis-(β-methylaminocrotonyl)-ethylenediamine, N,N'-bis-(β-anilinocrotonyl)-hexamethylenediamine, N,N'-bis-(β-butylaminocrotonyl)-4,4'-diaminodiphenylmethane, N,N'-bis-(β-butylaminocrotonyl)-4,4'-diamino-dicyclohexylmethane and N,N'-bis-(β-cyclohexylaminocrotonyl)-1,4-diaminocyclohexane.

Examples of compounds of the formula VII are: N,N'-ethylene-bis-(β-aminocrotonic acid methylamide), N,N'-hexamethylene-bis-(β-aminocrotonic acid n-butylamide), N,N'-(2,4,4-trimethyl)-hexamethylene-bis-(β-aminocrotonic acid n-butylamide), N,N'-butylene-bis-(β-aminocrotonic acid diethylamide), N,N'-p-phenylene-bis-(β-aminocrotonic acid anilide), N,N'-4,4'-diphenylmethane-bis-(β-aminocrotonic acid methylanilide), N,N'-4,4'-3,3'-dimethyldicyclohexylmethane-bis-(β-aminocrotonic acid cyclohexylamide) and N,N'-(di-γ-propylene)-5,5-dimethylhydantoin-bis-(β-aminocrotonic acid morpholide).

Compounds of the formula VIII are: N,N'-bis-(β-aminocrotonyl)-piperazine, N,N'-bis-(β-aminocrotonyl)-tetrahydropyrimidine and N,N'-bis-(β-aminocrotonyl)-imidazolidine.

Examples of compounds of the formula IX are: 1,2-ethylene glycol bis-(β-aminocrotonate), 1,4-butylene glycol bis-(β-aminocrotonate), 1,6-hexamethylene glycol bis-(β-aminocrotonate), α,ω-diethylene glycol bis-(β-aminocrotonate), α,ω-triethylene glycol bis-(β-aminocrotonate), 1,4-cyclohexanediol bis-(β-aminocrotonate), hydroquinone bis-(β-aminocrotonate), 2,2-bis-(4-hydroxyphenyl)-propane bis-(β-aminocrotonate), α,α'-dihydroxy-p-xylylene bis-(β-aminocrotonate), bis-(β-hydroxyethyl)-5,5-dimethylhydantoin bis-(β-aminocrotonate), 1,2-ethylene glycol bis-(β-methylaminocrotonate), 1,4-butylene glycol bis-(β-butylaminocrotonate), 2,2-bis-(4-hydroxyphenyl)-propane bis-(β-anilinocrotonate), trimethylolpropane tris-(β-aminocrotonate) and pentaerythritol tetra-(β-aminocrotonate).

Examples of compounds of the formula X are: N-(β-aminocrotonyl)-ethanolamine β-aminocrotonate, 1-N-(β-aminocrotonyl)-propanolamine 3-(β-aminocrotonate) and N-(β-aminocrotonyl)-p-aminophenol β-aminocrotonate.

The epoxide compound (a) can be converted to a macromolecular substance using the β-aminocrotonic acid derivatives of the formulae I to X on their own, in which case the curable mixture always contains the epoxide compound in an amount greater than the equivalent amount. If the reaction of the epoxide compound with the β-aminocrotonic acid derivatives is carried out, if desired, in the presence of a third reactant, such as a polyamine of the formula XI, a polycarboxylic acid anhydride of the formula XII or a maleimide of the formula XIII, the mixture of β-aminocrotonic acid derivative and the third reactant contains at most 70%, preferably 1 to 50% and in particular 20 to 50% of amino, anhydride or imide group equivalents, based on the sum of the equivalents of β-aminocrotonic acid derivative and amino group or anhydride group or imide group.

The present invention thus also relates to curable mixtures of epoxide compounds and β-aminocrotonic acid derivatives of the formulae I to X, which additionally contain a polyamine of the formula XI, a polycarboxylic acid anhydride of the formula XII or a maleimide of the formula XIII.

The polyamines of the formula XI are known compounds. Examples of suitable polyamines are: 4,4'-diamino-dicyclohexylmethane, 1,4-diamino-cyclohexane, m-phenylenediamine, p-phenylenediamine, 4,4'-diamino-diphenylmethane, bis-(4-aminophenyl)-2,2-propane, 4,4'-diamino-diphenyl ether, 4,4'-diaminodiphenylsulfone, 1,5-diaminonaphthalene, m-xylylenediamine, p-xylylenediamine, ethylenediamine, hexamethylenediamine, bis-(γ-aminopropyl)-5,5-dimethylhydantoin, 4,4'-diaminotriphenyl phosphate, 4,4'-diaminotriphenyl thiophosphate, 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl ether, 2,4,4'-triaminodiphenylmethane, 2,4,4'-triaminodiphenylsulfone, 2,4,4'-triaminobenzophenone, 2,4,4'-triamino-3-methyl-diphenylmethane, N,N,N-tri-(4-aminophenyl)-amine, tri-(4-aminophenyl)-methane, tri-(4-aminophenyl) phosphate, tri-(4-aminophenyl) phosphite, tri-(4-aminophenyl) thiophosphate, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminophenyl ether, 3,3',4,4'-tetraaminodiphenylmethane, 3,3',4,4'-tetraaminodiphenylsulfone and 3,3-bis-(3,4'-diaminophenyl)-pyridine.

Compounds which can be employed as the polycarboxylic acid anhydride of the formula XII are the known aliphatic, cycloaliphatic or aromatic anhydrides. Compounds preferably used are the cycloaliphatic polycarboxylic acid anhydrides, such as Δ⁴-tetrahydrophthalic anhydride, 4-methyl-Δ⁴-tetrahydrophthalic anhydride, hexahydrophthalic anhydride, 4-methylhexahydrophthalic anhydride, 3,6-endomethylene-Δ⁴-tetrahydrophthalic anhydride (=nadic anhydride), 4-methyl-3,6-endomethylene-Δ⁴-tetrahydrophthalic anhydride (=methylnadic anhydride) and 3,4,5,6,7,7-hexachloro-3,6-endomethylene-tetrahydrophthalic anhydride (=chloroendic anhydride) and the Diels-Alder adduct of 2 mols of maleic anhydride and 1 mol of 1,4-bis-(cyclopentadienyl)-2-butene, or aromatic polycarboxylic acid anhydrides, such as phthalic anhydride.

The maleimides of the formula XIII are likewise a known category of compounds. Preferably, in the formula XIII, A is a radical of the formulae

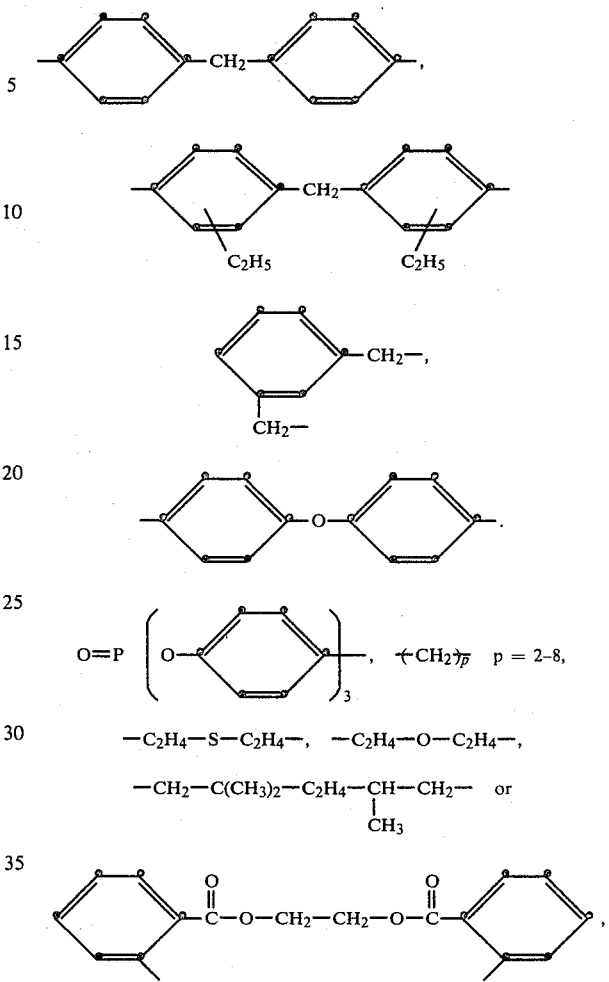

Z is the vinylene radical and x is 2 or 3. In particular, the bis-maleimides are used. In a preferred embodiment, bis-maleimides are used in which A, in the formula XIII, is an aliphatic radical.

Specific examples of the maleimides of the formula XIII are: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide, N,N'-(diphenyl ether)-bis-maleimide, N,N'-4,4'-diphenylsulfone-bis-maleimide, N,N'-4,4'-dicyclohexylmethane-bis-maleimide, N,N'-α,α-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, the N,N',N''-tris-maleimide of tris-(4-aminophenyl) phosphate and the N,N',N''-tris-maleimide of tris-(4-aminophenyl) thiophosphate.

Curing of the mixtures according to the invention is effected by warming the mixtures to temperatures of between 120° and 250° C., preferably 150°-200° C. and in particular 130°-180° C., whereupon the mixtures are converted to crosslinked, insoluble and infusible products without the emission of volatile reaction products.

It is also possible first to prepare a prepolymer from the mixtures according to the invention, by heating the homogeneously mixed starting materials, which are finely ground if necessary, to 140° C. for a time, so that a product forms which is still thermoformable and is partially soluble. If necessary, this prepolymer must be ground again to a processable powder. The prepolymerisation can also be effected by heating a solution or suspension of the starting materials. Suitable substances for this purpose are those which do not react with the starting materials and which dissolve these materials to an adequate extent if desired. Examples of such liquids are: dimethylformamide, tetramethylurea, dimethylsulfoxide, N-methylpyrrolidone, dichloroethylene, tetrachloroethylene, tetrachloroethane, tetrabromoethane, chlorobenzene, dichlorobenzene, bromobenzene, cyclohexanone, dioxan or alkylated aromatic hydrocarbons.

The curable mixtures according to the invention are used in particular in the fields of surface protection, electrical engineering, laminating processes and in the building trade. They can be used in a formulation which in each case is suited to the particular application, in the unfilled or filled state and if desired in the form of solutions or dispersions, and as lacquers, compression moulding compositions, sintering powders, dipping resins, injection moulding formulations, impregnating resins, binders, laminating resins and foam resins and especially as casting resins.

The invention therefore also relates to a process for the preparation of crosslinked, insoluble and infusible plastic products, which comprises reacting epoxide compounds containing, on average, more than one epoxide group in the molecule with β-aminocrotonic acid derivatives of the formulae I to X and, if desired, polyamines of the formula XI, polycarboxylic acid anhydrides of the formula XII or maleimides of the formula XIII, at temperatures between 120° and 250° C. and preferably between 150° and 200° C.

The production, according to the invention, of the crosslinked, infusible products is as a rule effected with simultaneous shaping to give mouldings, sheet-like structures, laminates, adhesive bonds or foams. The additives customarily used in the technology of curable plastics, such as fillers, plasticisers, pigments, dyes, mould release agents, blowing agents and flame retardants, can be added to the curable mixtures. Fillers which can be used are, for example, glass fibres, mica, quartz powder, kaolin, colloidal silica or metal powders; a mould release agent which can be used is, for example, calcium stearate and blowing agents which can be used are, for example, azodicarboxylic acid amides, α,α'-azoisobutyronitrile or organic sulfohydrazides. Depending on its type, the blowing agent is employed in amounts of 0.5–15% by weight, based on the total amount of the mixture.

If a prepolymer is first prepared from the curable mixtures, this, when ground to a fine powder, can be used as a surface protection agent by the whirl-sintering process. A solution or suspension of the prepolymer in a suitable solvent can be used to prepare laminates, by impregnating porous sheet-like structures, such as fabrics, fibre mats or non-wovens, especially glass fibre mats or glass fibre fabric, with solutions or suspensions and removing the solvent by a drying process. Further curing is effected in a press, preferably at 170°–250° C. and in particular at 130°–180° C. and under 5–200 kp/cm² pressure. It is also possible only to effect precuring of the laminates in the press and to post-cure the products thus obtained in an oven at 200°–280° C., and preferably at 180°–230° C., until optimum characteristics for use are obtained.

EXAMPLES 1–39

The epoxide and the derivative of the β-aminocrotonic acid were mixed and, in a flask, melted or dissolved in one another and degassed. The bath temperature was 100°–150° C., depending on the melting point of the β-aminocrotonic acid derivative and the viscosity of the epoxide. If 150° C. was not sufficient to melt the mixture, the temperature of the oil bath was raised so that it was about 20° C. below the melting point of the solid product. The melts obtained in this way could be poured into moulds having dimensions of 140×140×4 mm without difficulty. By warming in an oven, the melts were converted to clear, transparent, yellow to red-brown mouldings. The curing cycle in general was 4 hours/140° C., 8 hours/160° C. and 2–4 hours/180° C. and an additional 1–2 hours' warming at 200° C. does no harm.

Epoxide compound A is a commercially available diglycidyl ether of bisphenol A with an epoxide equivalent weight of 194. Epoxide compound B is a commercially available N,N,N',N'-tetraglycidyl-4,4'-diaminodiphenylmethane with an epoxide equivalent weight of 108. Epoxide compound C is a glycidylised phenol novolac with an epoxide equivalent weight of 175. Epoxide compound D is terephthalic acid diglycidyl ether.

Anhydride A is an anhydride mixture consisting of hexahydrophthalic anhydride and about 10% by weight of tetrahydrophthalic anhydride. Amine A is a mixture of 4,4'-diamino-3,3'-diethyl-diphenylmethane, 4,4'-diamino-3-ethyl-diphenylmethane and 4,4'-diaminodiphenylmethane.

The mixing ratio in Table 1 indicates the number of epoxide group equivalents per one equivalent of β-aminocrotonic acid derivative containing the grouping

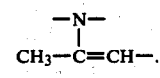

Table 2 gives the mixing ratio based on epoxide group equivalents, β-aminocrotonic acid derivative equivalents and equivalents of the third component (amino, anhydride or imide group equivalents).

The test data for mouldings of β-aminocrotonic acid derivatives and epoxides are given in Table 1 and those of test pieces obtained from β-aminocrotononitrile, epoxide and a 3rd component are given in Table 2. The flexural strength was determined in accordance with VSM 77,103 (Standards of the Verein Schweizerischer Maschinenindustrieller), the impact strength was determined according to VSM 77,105 and the heat distortion point was determined according to ISO/R 75 (Standards of the International Standard Organisation/-Recommendation).

TABLE 1

Mixtures of β-aminocrotonic acid derivatives and epoxide compounds

| Example | Epoxide compound | Derivative of β-aminocrotonic acid | Mixing ratio [equivalent] | Flexural strength [N/mm²] | Impact strength [kJ/m²] | Heat distortion point [°C.] |
|---|---|---|---|---|---|---|
| 1 | A | $(NC-CH=C(CH_3)-NH-C_3H_6)_2$ | 2/1 | 147 | 22.8 | 112 |
| 2 | A | " | 5/1 | 146 | 16.0 | 106 |
| 3 | C | " | 3/1 | 168 | 13.0 | 109 |
| 4 | B | " | 5/1 | 168 | 20.0 | 159 |
| 5 | D | " | 3/1 | 124 | 10.2 | 108 |
| 6 | A | $(NC-CH=C(CH_3)-NH-C_6H_4-CH_2)_2$ | 3/1 | 162 | 17.0 | 115 |
| 7 | B | " | 3/1 | 164 | 16.5 | 191 |
| 8 | B | " | 5/1 | 135 | 17.2 | 211 |
| 9 | A | $(NC-CH=C(CH_3)-NH-CH_2)_2$ | 3/1 | 153 | 12.2 | 104 |
| 10 | A | $NC-CH=C(CH_3)-NH-C_6H_4-NH-C(CH_3)=CH-CN$ | 3/1 | 155 | 14.5 | 121 |
| 11 | A | $NC-CH=C(CH_3)-NH-CH_2-C_6H_7(CH_3)_3-NH-C(CH_3)=CH-CN$ | 3/1 | 121 | 11.5 | 109 |
| 12 | B | $NC-CH=C(CH_3)-NH_2$ | 5/1 | 191 | 13.4 | 155 |
| 13 | B | " | 7/1 | 169 | 15.3 | 149 |
| 14 | B | $(H_2N-C(CH_3)=CH-COOC_2H_4)_2$ | 3/1 | 99 | 13.1 | 146 |
| 15 | C | " | 5/1 | 159 | 16.1 | 88 |
| 16 | B | " | 5/1 | 169 | 10.4 | 128 |
| 17 | A | $CH_3C(NH_2)=CH-COOC_2H_4-O-CH_2)_2$ | 5/1 | 107 | 11.6 | 63 |
| 18 | A | $CH_3C(NH_2)=CH-COOC_2H_4NHCO-CH=C(NH_2)-CH_3$ | 3/1 | 104 | 3.8 | 97 |
| 19 | B | $CH_3-C(NH_2)=CH-CONH-C_4H_9$ | 5/1 | 143 | 10.4 | 132 |
| 20 | A | $CH_3C(NH_2)=CH-CONHC_2H_4)_2$ | 3/1 | 147 | 45.7 | 109 |
| 21 | A | $CH_3C(NH_2)=CH-CONH-C_3H_6)_2$ | 3/1 | 135 | 73.6 | 116 |
| 22 | A | $CH_3-C(NH_2)=CH-CONH-C_6H_4-CH_2)_2$ | 5/1 | 156 | 16 | 106 |
| 23 | A | $CH_3-C(NH_2)=CH-CON(C_6H_{11})-C_3H_6)_2$ | 3/1 | 116 | 8.6 | 88 |
| 24 | C | $CH_3-C(NH_2)=CH-CONH-C_3H_6)_2$ | 3/1 | 157 | 58 | 115 |
| 25 | B | $CH_3-C(NH_2)=CH-CONH-C_2H_4)_2$ | 5/1 | 159 | 18 | 195 |
| 26 | B | $CH_3-C(NH_2)=CH-CONH-C_3H_6)_2$ | 5/1 | 137 | 10.1 | 193 |

TABLE 1-continued
Mixtures of β-aminocrotonic acid derivatives and epoxide compounds

| Example | Epoxide compound | Derivative of β-aminocrotonic acid | Mixing ratio [equivalent] | Flexural strength [N/mm²] | Impact strength [kJ/m²] | Heat distortion point [°C] |
|---|---|---|---|---|---|---|
| 27 | A | $CH_3-\underset{\underset{NH_2}{\|}}{C}=CH-CON\begin{pmatrix}CH_2-\\CH_2-\end{pmatrix}_2$ | 3/1 | 131 | 11.9 | 100 |

TABLE 2
Mixtures of β-aminocrotonic acid derivatives, epoxide compounds and a 3rd component

| Example | Epoxide compound | β-Aminocrotonic acid derivative | 3rd component | Mixing ratio [equivalents] | Gel time [minutes/°C] | Flexural strength [N/mm²] | Impact strength [kJ/m²] | Heat distortion point [°C] |
|---|---|---|---|---|---|---|---|---|
| 28 | A | $NC-CH=C-NH-\langle\bigcirc\rangle\!\!-\!CH_2\rangle_2$ | ![phthalimide-CH2-]2 structure | 3:1:2 | | 71 | 10.8 | 174 |
| 29 | A | " | bis-maleimide-$C_6H_{12}$ | 3:1:2 | | 157 | 17.1 | 112 |
| 30 | A | " | Anhydride A | 3:1:0,5 | 120/160 | 114 | 11.3 | 172 |
| 31 | A | " | Amine A | 4:1:1 | 22/160 | 151 | 20.8 | 111 |
| 32 | A | " | Anhydride A[1] | 5:1:1 | 32,5/160 | | | 96 |
| 33 | A | $NC-CH=\underset{\underset{CH_3}{\|}}{C}-NH-C_3H_6\rangle_2$ | $H_2N-\langle\bigcirc\rangle\!\!-\!CH_2\rangle_2$ | 4:1:1 | 6/160 | 166 | 24.1 | 108 |
| 34 | A | $NC-CH=\underset{\underset{CH_3}{\|}}{C}-NH-CH_2\rangle_2$ | Anhydride A | 4:1:1 | 65/100 | 103 | 9.8 | 93 |
| 35 | A | $CH_3-\underset{\underset{NH_2}{\|}}{C}=CH-COOC_2H_4\rangle_2$ | Amine A | 4:1:1 | 35,5/160 | 95 | 22.2 | 89 |
| 36 | A | " | Anhydride A[1] | 4:1:1 | 50/160 | 111 | 10.9 | 85 |
| 37 | A | $CH_3-\underset{\underset{NH_2}{\|}}{C}=CH-CONHC_3H_6\rangle_2$ | Amine A | 4:1:1 | 18/160 | 143 | 70.7 | 121 |
| 38 | A | " | Anhydride A[1] | 4:1:1 | 32/160 | 135 | 13.5 | 91 |
| 39 | A | " | Anhydride A[1] | 6:1:1 | 61/160 | 134 | 14.8 | 81 |
| 40 | A | $NC-CH=\underset{\underset{CH_3}{\|}}{C}-NH-C_2H_4\rangle_2N-\underset{\underset{CH_3}{\|}}{C}=CH-CN$ | | 5/1 | | 70 | | 62 |
| 41 | B | $CH_3-\underset{\underset{NH_3}{\|}}{O}=CH-CO-NH_2$ | | 5/1 | | 156 | 16.4 | 166 |

[1] In order to accelerate the epoxide/anhydride reaction, 0.5 percent by weight of benzyldimethylamine was added.

EXAMPLE 42

Epoxide resin A and the β-aminocrotonic acid derivative of the formula

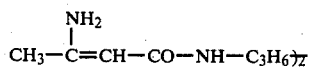

were mixed in an equivalent ratio of 3:1 and melted at 150° C. The melt was degassed and, in order to produce mouldings, poured into moulds and cured at 130° C. for 12 hours. Moulded materials with the following characteristics were obtained:

| Flexural strength | 151 N/mm² |
|---|---|
| Impact strength | 34.4 kJ/m² |
| Heat distortion point | 146° C. |

Storage stability
(a) Theoretical epoxide content of the above mixture=4.22 equivalents/kg
(b) Epoxide content after melting and degassing the above mixture at 150° C. for 15 minutes=3.32 equivalents/kg
(c) Epoxide content of the cooled melt after storing at room temperature for 12 days=3.31 equivalents/kg The fall in the epoxide content from 4.22 to 3.32 equivalents/kg is to be ascribed to a preliminary reaction during melting and degassing.

EXAMPLE 43

7.6 g of epoxide resin A and 1.9 g of β-aminocrotonic acid p-hydroxyanilide were mixed well and the mixture was converted, in a small aluminum dish (diameter 5.5 cm), to a clear, transparent, hard moulding by warming at 140° C. for 12 hours. The glass transition temperature determined for this moulding was 134° C.

EXAMPLE 44

8.4 g of an epoxide resin mixture consisting of 70 parts by weight of N,N'-diglycidyl-5,5-dimethylhydantoin and 30 parts by weight of N-glycidyl-N'-oxypropylglycidyl-5,5-dimethylhydantoin and having an epoxide equivalent weight of 141 and 2.5 g of N,N'-bis-(β-aminocrotonyl)-butylenediamine were converted into a cured moulding as described in Example 43; the glass transition temperature measured for this moulding was 171° C.

What is claimed is:

1. A heat-curable mixture which is stable on storage, which contains (a) an epoxide compound with, on average, more than one epoxide group in the molecule, (b) a β-aminocrotonic acid derivative of the formula I to X

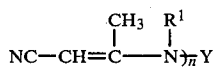  (I)

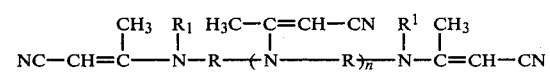  (II)

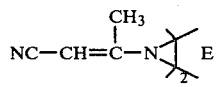  (III)

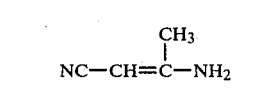  (IV)

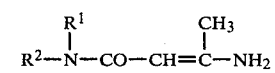  (V)

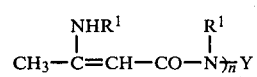  (VI)

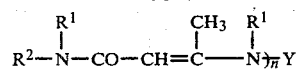  (VII)

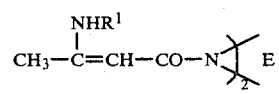  (VIII)

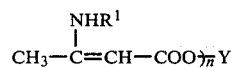  (IX)

or

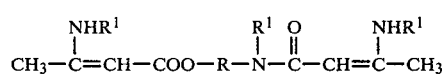  (X)

in which $R^1$ and $R^2$ independently of one another are each a hydrogen atom, alkyl having 1 to 6 C atoms, cycloalkyl having 5 or 6 C atoms or aryl having 6 to 10 C atoms, Y is a n-valent organic radical having 2 to 30 C atoms, R is an aromatic or aliphatic radical having not more than 30 C atoms, E, together with the two N atoms, is a heterocyclic, five-membered or six-membered ring and n is a number from 1 to 3, and (c) a polyamine of the formula XI $$G-(NH_2)_y \quad (XI)$$

in which the radical G is a y-valent organic radical having 2 to 40 C atoms and y is a number from 2 to 4; the curable mixture containing 2 to 8 epoxide equivalents per 1 equivalent of β-aminocrotonic acid derivative, containing the grouping

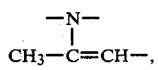

and a maximum of 70% of amino group equivalents, based on the sum of the equivalents of β-aminocrotonic acid derivative and amino group.

2. A mixture according to claim 1, which contains a glycidyl ether or a N-glycidyl compound as the epoxide compound and a β-aminocrotonic acid derivative of the formula I, III, IV, V, VI, VII, VIII, IX or X, in which $R^1$ is a hydrogen atom and $R^2$ is an alkyl having 1 to 6 C atoms, Y is alkylene having 2 to 10 C atoms, m- or p-phenylene or a divalent radical of the formulae $-C_2H_4-O-C_2H_4-$, $-C_2H_4-S-C_2H_4-$,

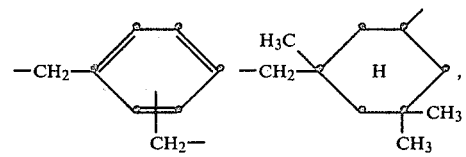

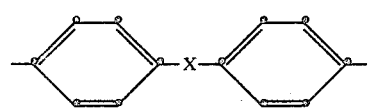

-continued

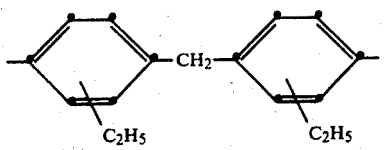

wherein X is O, S or CH$_2$;

or

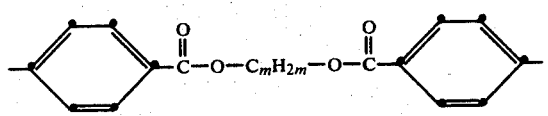

m is 2 to 8;

R is an aliphatic radical having not more than 10 C atoms, the grouping

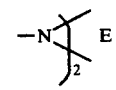

is the radical of the formula

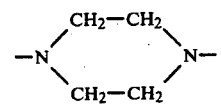

and n is 2.

3. A mixture according to claim 1, which contains at least one diglycidyl ether of a dihydric phenol as the epoxide compound and a β-aminocrotonic acid derivative of the formula I, IV, V or VI, in which R$^1$, R$^2$, Y and n are as defined in claim 2.

4. A mixture according to claim 1, which contains at least one diglycidyl ether of a dihydric phenol as the epoxide compound and a β-aminocrotonic acid derivative of the formula VI in which R$^1$, Y and n are as defined in claim 2.

5. A mixture according to claim 1, which contains an epoxide compound with, on average, more than one epoxide group in the molecule, a β-aminocrotononitrile of the formula I and a polyamine of the formula XI.

6. The mixture according to claim 5, wherein said polyamine is a diamine.

* * * * *

UNITED STATES PATENT AND TRADEMARK OFFICE
CERTIFICATE OF CORRECTION

PATENT NO. : 4,360,655
DATED : November 23, 1982
INVENTOR(S) : Theobald Haug

It is certified that error appears in the above-identified patent and that said Letters Patent is hereby corrected as shown below:

Cover page, Item [30]:

change "Aug. 11, 1978" to -- Nov. 8, 1978 --

Signed and Sealed this

Twenty-ninth Day of March 1983

[SEAL]

Attest:

GERALD J. MOSSINGHOFF

Attesting Officer  Commissioner of Patents and Trademarks